June 3, 1958  D. W. HAWK  2,837,349
UNIVERSAL HITCH CONSTRUCTION
Filed Dec. 18, 1956  3 Sheets-Sheet 1

Inventor
Dale W. Hawk
By Charles L. Schwab
Attorney

June 3, 1958 D. W. HAWK 2,837,349
UNIVERSAL HITCH CONSTRUCTION
Filed Dec. 18, 1956 3 Sheets-Sheet 2

Inventor
Dale W. Hawk
By Charles L. Schwab
Attorney

June 3, 1958 D. W. HAWK 2,837,349
UNIVERSAL HITCH CONSTRUCTION
Filed Dec. 18, 1956 3 Sheets-Sheet 3

Inventor
Dale W. Hawk
By Charles L. Schuck
Attorney

United States Patent Office 2,837,349
Patented June 3, 1958

2,837,349
UNIVERSAL HITCH CONSTRUCTION
Dale W. Hawk, Cedar Rapids, Iowa, assignor to Allis-Chalmers Manufacturing Company, Milwaukee, Wis.
Application December 18, 1956, Serial No. 629,018
12 Claims. (Cl. 280—492)

This invention relates to articulated motor vehicles and is particularly concerned with a hitch construction for articulated vehicles of the type in which a wheel supported draft unit and a wheel supported trailer unit are pivotally connected with each other for relative angular movement about a common vertical axis.

Although the present invention is not limited thereto, it is especially applicable and will be shown and described in connection with a hitch construction for vehicles having a two wheel draft unit and an earth moving trailer unit, such as a scraper or rock wagon, for transporting and discharging earth and similar materials. A two wheel tractor unit is generally employed in earth moving operations where it is necessary to transport such materials substantial distances over rough terrain. The higher speed of operation that is obtained by employing these draft units, as compared with similar crawler type of tractors, has contributed to the efficiency and economy of such material handling operations. Due to the operation of these vehicles at high speeds over uneven terrain, difficulties have been encountered in providing suitable hitch constructions that can withstand the severe stresses imposed for protracted periods. One of the common difficulties encountered is a fatigue failure of the hitch pin mountings.

The difficulties encountered are aggravated by the fact that it is customary during the excavating operation to employ a separate tractor to push the scraper. Such pushing of heavy loads over the rough ground surfaces causes severe strain and wear on the hitch construction. The hitch construction is further complicated by the fact that the steering is generally accomplished by horizontal angling of the front member units about the vertical axis of the pivotal connection.

It is desirable to have a simply constructed but rugged hitch construction that is capable of easy assembly and of continuous operation over long periods under conditions of heavy loads without breakage or excessive wear. It is well known that when bearing clearances become excessive there results a pounding action which may destroy various hitch parts. To increase the useful life of the bearings it is desirable that some means be provided to eliminate the axial and radial play resulting from normal wear on bearings and thereby avoid damage to the journal and bearing surfaces as such play becomes excessive. A suitable hitch construction should have horizontal hitch pin mountings which can effectively reduce any failures due to the compressive surface fatigue of the pin supports. Because of the space limitations at the rear of the tractor, the parts associated with the hitch construction must not be unduly large in size but should be specially designed to withstand the particular type of loading imposed upon it.

Generally, it is an object of this invention to provide an improved hitch construction that will permit adjustments to the moving parts without the necessity of disassembling them.

Further, it is an object of this invention to provide horizontal hitch pin mountings which will effectively resist any compressive surface fatigue of the pin supports. It is also an object of this invention to provide a hitch pin mounting that will effectively resist lateral shear loads. A further object of this invention is to provide a horizontal hitch pin construction which can be readily adjusted to eliminate any excessive axial and radial play resulting from wear on the bearings.

Another object of this invention is to provide a rugged and reliable hitch construction that can be readily disassembled in order that worn parts can be replaced.

Foregoing and other objects and advantages are attained by the present invention, various novel features which will become apparent as the following specification is read in conjunction with the accompanying drawings wherein.

Figure 1:
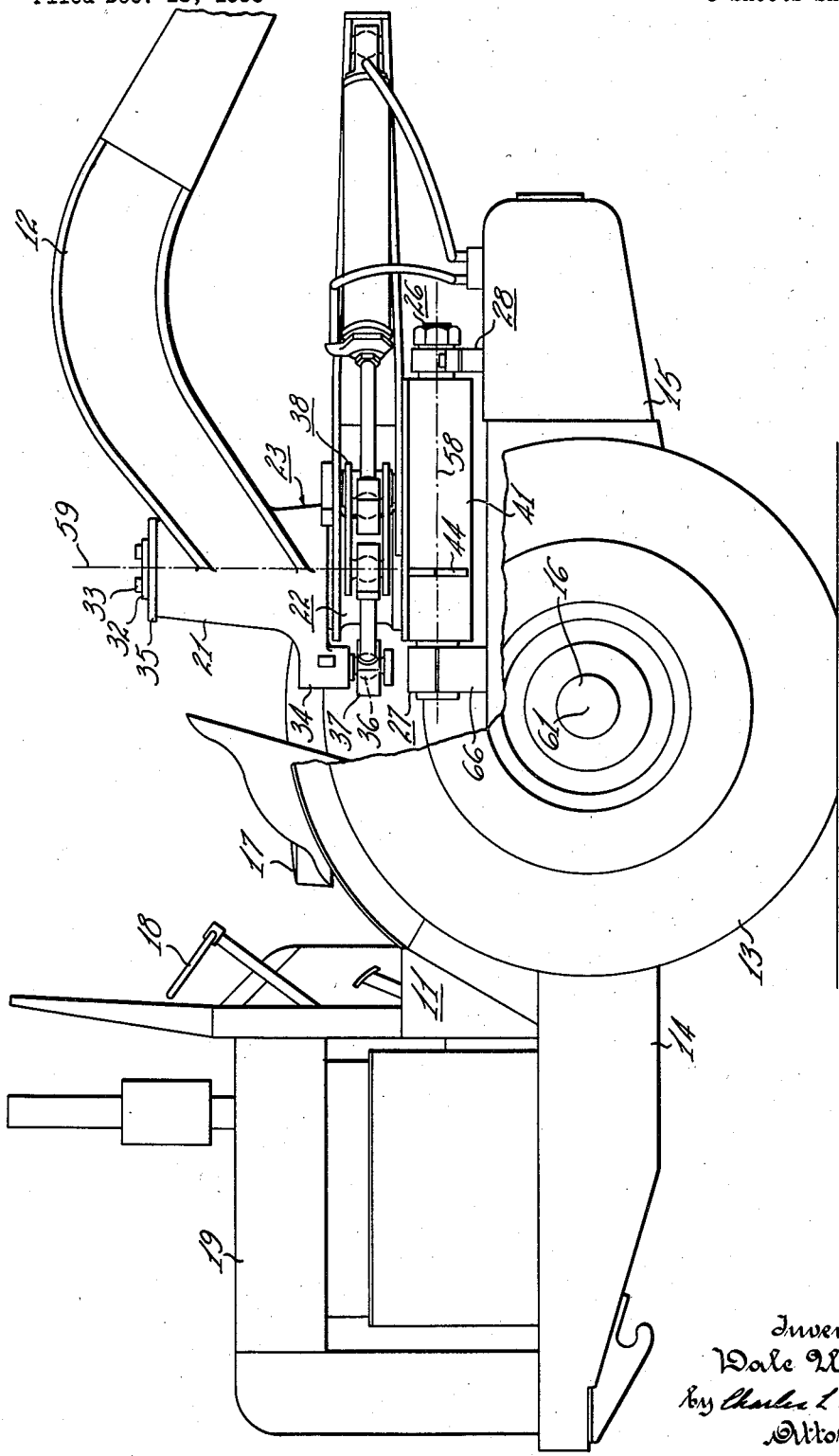
Fig. 1 is a side elevation showing the gooseneck portion of a trailer and a tractor with a portion of the tire cut away to illustrate the hitch construction of this invention.

Referring to Fig. 1, the articulated vehicle here shown as embodying the invention consists of a two wheel tractor 11 and a trailer unit, not shown, connected to the tractor 11 by the gooseneck 12. The tractor 11 includes a pair of transversely spaced ground engaging drive wheels 13 and a frame 14. At the rear of the tractor is an auxiliary housing 15, forward of which the rear end of the frame is formed as a gear housing, in the sides of which the wheel axle 16 is journaled. An operator's seat 17 is mounted above the frame 14 at an intermediate point. A steering wheel 18 is conveniently provided in front of the operator's seat 17. An engine is mounted on the forward portion of the frame and is enclosed by a hood 19.

Figure 3:
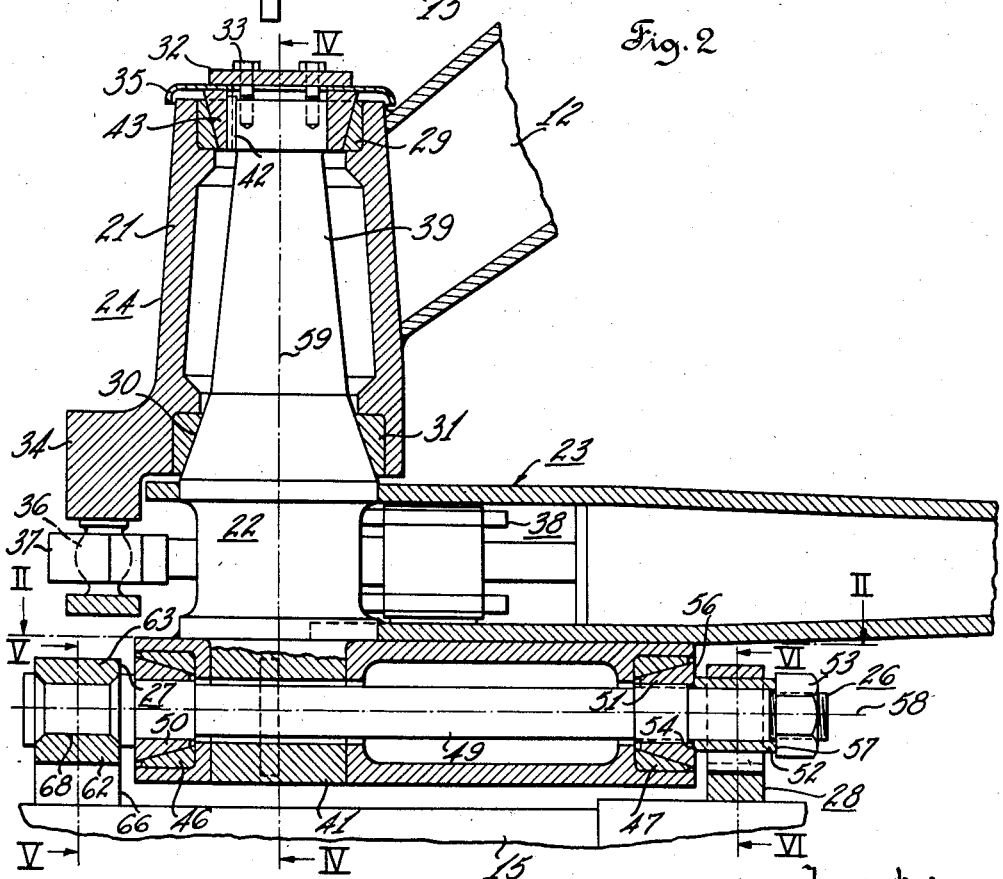
Fig. 3 is a side elevation of the hitch construction, shown as a sectional view along the longitudinal axis of the tractor, having a portion of the steering mechanism cut away.

Referring to Fig. 3, the trailer unit is provided at its forward end with a gooseneck 12 having at its forward end a pedestal housing 21 adapted to rotatably engage a kingpin member 22. This type of connection permits the traction wheels 13 of the tractor 11 to support a portion of the weight of the trailer unit and its load. A two wheeled tractor such as is shown herein, is in a stable condition only when connected with the trailer unit through the gooseneck 12 and the hitch construction 23. The hitch construction, which is the subject of the present invention, is comprised of a pedestal assembly 24, a kingpin member 22, a horizontal hitch pin assembly 26, a front hitch pin support 27 and a rear hitch pin support 28.

The pedestal assembly 24 consists of a pedestal housing 21, an upper pedestal bearing 29, a lower pedestal bushing 31, a skirt 35, a securing plate 32 and a plurality of cap screws 33. The pedestal housing 21 is secured against axial separation by the securing plate 32 and cap screws 33. Projecting from the forward end of the pedestal housing 21 is a depending torque arm 34 which supports a pair of ball pins 36 and the links 37 of the steering mechanism 38.

The pedestal assembly 24 joins with the kingpin member 22 to form an articulated joint which allows the front tractor unit of the vehicle to be angled horizontally relative to the trailer unit. The kingpin member 22 has an upstanding portion 39 and a hollow horizontal base portion 41. At the upper end of the upstanding portion 39 an integrally formed key 42 is provided. An upper journal 43 axially slidable of the upstanding portion 39 has a keyway which engages the key 42, which restrains a rotation of the journal 43 relative to the upstanding portion 39. The journal 43 is in rotatable engagement with the upper pedestal bushing 29. A journal 30 integrally formed on the upstanding portion 39 is in rotatable engagement with the bushing 31.

The skirt 35 serves as a protective covering for the bushings and journals and cooperates with the securing plate 32 to urge the journal 43 into proper bearing contact. It should be noted that there is a clearance between the lower horizontal surface of the securing plate 32 and the upper horizontal surface of the upstanding portion 39. As the cap screws 33 are tightened the securing plate 32 forces the skirt 35 against the journal 43. When the bushings 43 and 31 wear in service the pedestal assembly 24 tends to assume a lower vertical position on the upstanding portion 39, causing radial and axial play to develop between the journal 43 and the bushing 29. The tightening of the cap screws 33 will, therefore, slide the journal 43 into proper bearing contact with the bushing 29 to eliminate the excessive play. Such play is objectionable in that it may result in a pounding out of the bushing 29. If it becomes necessary, the bushing 29 and the journal 43 can be removed without disconnecting the gooseneck 12 from the tractor unit 11.

Figure 2:
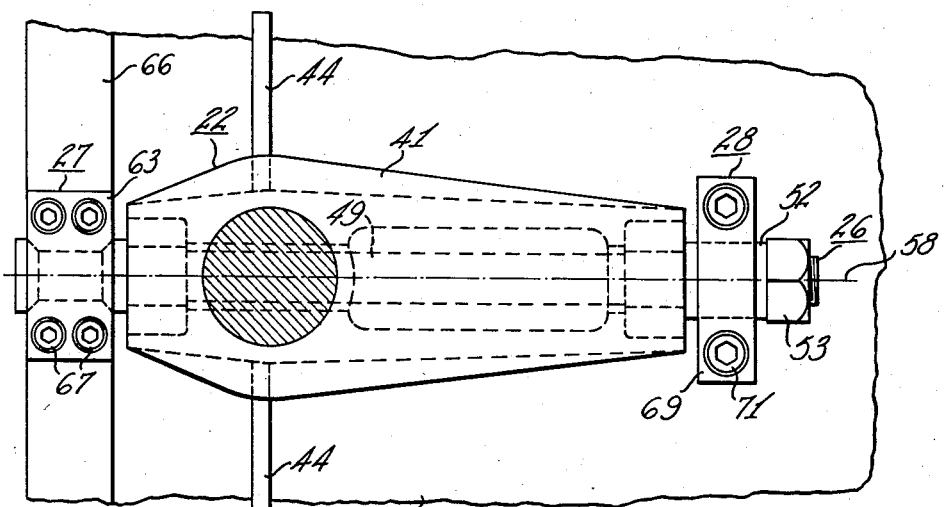
Fig. 2 is a sectional view along the line II—II of Fig. 3.
Figure 4:
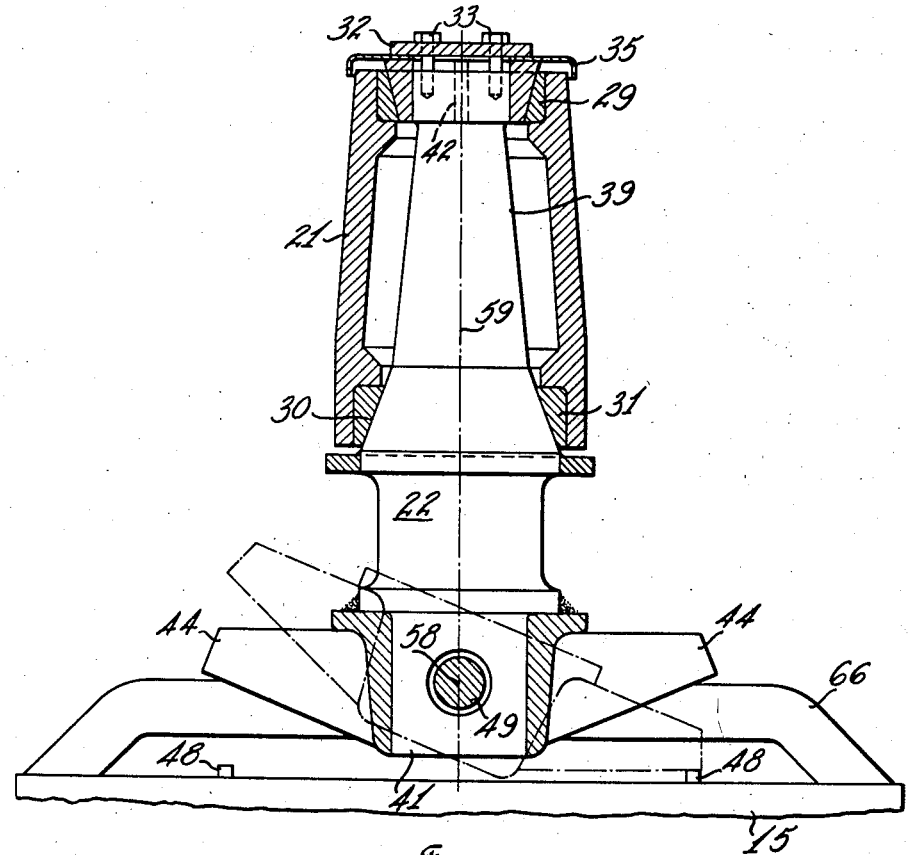
Fig. 4 is a sectional view along line IV—IV of Fig. 3.

The front end of the horizontal portion 41 houses a tapered bearing 46. An opposing tapered bearing 47 is mounted at the other end. Referring to Fig. 2, horizontal portion 41 of the kingpin member 22 has a pair of tilt stop plates 44 extending laterally on each side. Referring to Fig. 4, the stop plates 44 are shown in dotted outline when the rear unit is at a position of maximum transverse tilt. The stop plates 44 butt against suitable stop blocks 48 secured to the tractor housing 15.

As shown in Fig. 3, the horizontal hitch pin assembly 26 is comprised of a horizontal hitch pin 49, a front tapered journal 50, a rear tapered journal 51, a radially contractible sleeve 52 and a lock nut 53. The front tapered journal 50 is restrained against movement axially on the hitch pin 49 by a shoulder and rotatably engages the front bearing 46. The rear tapered journal 51 is splined to the hitch pin 49 and rotatably engages the rear sleeve bearing 47. The compressible sleeve 52 is concentrically mounted about the rearward portion of the horizontal hitch pin 49. The front face 54 of the sleeve 52 abuts against the rear face 56 of the tapered journal 51 in an axial thrust transmitting relationship and the rear face 57 of the sleeve 52 abuts against the lock nut 53. As the lock nut 53 is tightened the sleeve 52 can be forced against the splined journal 51. If the axial movement of the sleeve 52 is unrestricted, the splined journal 51 is urged forward on the hitch pin 49, as the lock nut 53 is tightened, thereby eliminating any excessive clearance existing between the front and rear bearings 46, 47 and their respective journals 50, 51.

The horizontal hitch pin 49 is supported at one end by the front hitch support 27 and at the other end by the rear hitch support 28. As shown in Fig. 4 the horizontal hitch pin 49 allows the kingpin member 22 freedom of rotation about the horizontal axis 58. This tilting movement is necessary to allow the articulated vehicle to keep all of its wheels in ground contact when traveling over uneven surfaces, without any loss of tractive effort.

Inasmuch as the vertical pivot axis 59 is located rearwardly of the tractor wheel axis 61, as shown in Fig. 1, the weight of the trailer unit and its load tends to rotate the tractor unit 11 in a clockwise angular direction about its ground contact. This weight also tends to rotate the kingpin member 22 in a counterclockwise direction with respect to the tractor unit 11. Due to the fact that the pedestal bushings 29, 31 are located at points above the tractor wheel axis 61, as the tractor wheels 13 rotate to pull the trailer unit 11, the net effect of the forces exerted is to rotate the kingpin member 22 in the same direction relative to the tractor 11 as does the weight load. The net effect of these two turning moments results in a substantial compressive load on the front hitch pin support 27 and a tensile loading on the rear support 28.

Figure 5:
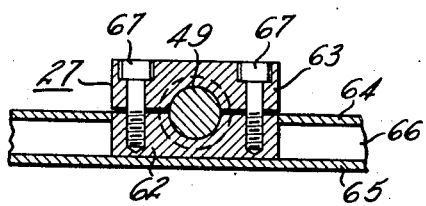
Fig. 5 is a sectional view along line V—V of Fig. 3.

To withstand the heavy compressive loading, the front hitch pin mounting 27 is constructed in a similar manner to the conventional type of split bushing. Referring to Fig. 5, a support block 62 is secured to upper and lower plates 64 and 65 of a crossbeam support 66. Four cap screws 67 secure a cap 63 and the support block 62 against the hitch pin 49. On each side of the support block 62 and the cap 63, as shown in Fig. 3, a 45° counterbored surface is provided. The mating surface 68 on the front end of the horizontal hitch pin 49 is turned down and tapered to correspond thereto. The tapered surface 68 secures the horizontal hitch pin 49 against longitudinal movement relative to the tractor in either direction. A predetermined clearance separates the support block 62 from the cap 63. This arrangement also provides a means of adjustment to eliminate any play that may develop between the support block 62 and cap 63. This is accomplished by adjusting the four cap screws 67 to lower the cap 63.

Figure 6:
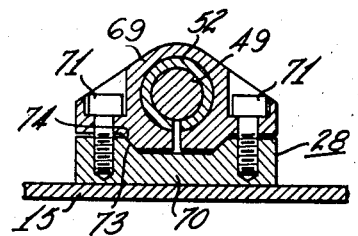
Fig. 6 is a sectional view along line VI—VI of Fig. 3.

Referring to Fig. 6, a rear hitch pin support 28 is provided to resist the heavy tensile loading. The rear support 28 is comprised of a support clamp or cap 69, a compressible sleeve 52, a support block 70 and two cap screws 71. The cap 69 serves as a clamp to restrain axial movement of the sleeve 52 and horizontal hitch pin 49 and has a split lower section having two tapered surfaces 73. It is bored to receive the axially contractible sleeve 52 which also has a split in its lower half. The cap 69 and the sleeve 52 are concentrically mounted on the end portion of the horizontal hitch pin 49. Thus, the sleeve 52 and cap 69 may be considered as the inner and outer elements of a clamping member having an axially slidable inner element.

A gripping action is initiated when the two tapered surfaces 73 of the cap 69 are forced against a pair of opposing tapered surfaces machined on support mounting block 70 by tightening the cap screws 71. Due to the split in the lower section of the cap 69 and the sleeve 52, the wedging reaction caused by the tapered surfaces 73, 74 draws the split ends together, resulting in a gripping of the hitch pin 49.

The use of a support block 70 and cap 69 with a wedging reaction has minimized the distortion that generally occurs under tensile loading in the conventional, completely split type of bushing support. Except for the area represented by the split, the load on the hitch pin 49 is transmitted to the entire inner circumferential area of the cap 69. In the conventional, completely split type of bushing support, the upper half would bear the full loading and consequently would fail more rapidly in service. It should be noted that any distortion that may occur due to the tensile loading on the cap 69 tends to increase the gripping action. The use of the tapered wedging surfaces 73, 74 has resulted in another advantage in that they relieve the cap screws 71 of lateral shear loads. These features have made it possible to construct a very compact hitch support which takes up a minimum amount of space at the rearward end of the tractor and also allows steering mechanism 38 to be disposed in a horizontal plane having a relatively low vertical location.

It is not necessary that the rear hitch support 28 provide resistance to any of the thrust loads imposed on the horizontal hitch pin 49 by the weight of the trailer unit with its load and the drag forces exerted by the tractor 11. The front hitch support 27 provides the necessary resistance to the thrust forces. The use of a crossbeam to secure the rear support 28 to the deck plate is eliminated.

It is apparent from this description that this hitch construction offers an easy and a positive method of adjusting for wear on the various support bearings. The upper and lower pedestal bushings 29, 31 undergo wear as the front unit is angled about the vertical axis 59 relative to the rear unit. This wear can be readily compensated for by adjusting the four cap screws 33. Play between the support block 62 and the cap 63 can be eliminated by tightening the cap screws 67.

Inasmuch as an articulated vehicle, such as has been described herein, is generally operated over rough and uneven terrain, severe loads are imposed upon the journals 50, 51, the bearings 46, 47 and the front and rear hitch supports 27, 28. In many installations it is necessary to completely disassemble various parts of the construction to renew or make adjustments for excessive wear on the bearing surfaces. In the applicant's invention adjustments for such wear are readily made by loosening the two cap screws 71 to release the wedging action and by tightening the lock nut to force the sleeve 52 against the splined journal 51 to draw the front and rear journals 50 and 51 into normal engagement with the sleeve bearings 46, 47. Thus, it can be seen that the useful life of bearing surfaces can be prolonged and the time required to eliminate excessive clearances resulting from extensive use of the apparatus can be considerably reduced.

Although the invention has been described with a certain degree of particularity, it is understood that the present disclosure has been made only by way of example and that numerous changes and details of construction and the combination and arrangement of parts may be resorted to without departing from the spirit and the scope of the invention as hereinafter claimed.

What is claimed is:

1. A hitch mounting for an articulated vehicle having front and rear units, interconnected for relative lateral tilting and horizontal angling about a kingpin member having an upstanding portion and a horizontal portion secured to one of said units, said hitch mounting comprising: a horizontal hitch pin rotatably connected to said kingpin member by a pair of longitudinally spaced bearings, each of said bearings having cooperating tapered bearing surfaces, a support means on said one of said units for rigidly restraining said horizontal hitch pin against radial and axial movement, a sleeve encompassing a portion of said hitch pin in longitudinally spaced relation to said first support means and in axial thrust transmitting relation to one of said bearings, a second support means restraining said sleeve and said hitch pin against radial movement relative to one of said units and selectively permitting axial movement of said sleeve to axially adjust said bearings.

2. A hitch mounting for an articulated vehicle having front and rear units, interconnected for relative lateral tilting and horizontal angling about a kingpin member having an upstanding portion and a horizontal portion secured to one of said units, said hitch mounting comprising: a horizontal hitch pin having a pair of opposed tapered journals longitudinally spaced on said hitch pin, one of said journals being slidable axially of said hitch pin, a pair of mating tapered bearings internally mounted in said horizontal portion of said member and rotatably engaging said journals on said hitch pin, a first support means on one of said units for restraining said horizontal hitch pin against radial and axial movement, a radially contractible sleeve encompassing a portion of said hitch pin and restraining said slidable journal against axial movement, a second support means constraining said sleeve and horizontal hitch pin against radial movement and selectively permitting axial movement of said sleeve to position said slidable journal and said horizontal portion of said kingpin member to adjust and maintain bearing contact between said journals on said hitch pin and said bearings in said horizontal portion.

3. In an articulated vehicle having a front and a rear unit, a hitch construction comprising: a kingpin member having an upstanding and a horizontal portion secured to said front unit, a pedestal housing secured in nonrotatable relation to said second unit and journaled on said upstanding portion of said kingpin member for horizontal pivoting of said front unit, an upper and a lower tapered bushing oppositely disposed within said pedestal housing, a tapered journal slidably mounted on said upstanding portion and having an external surface tapered complementary to the internal surface of said upper bushing, adjustable means urging said slidably mounted journal into bearing contact with said upper bearing, a lower external journal surface presented by said upstanding portion and tapered complementary to the internal surface of said lower bushing, a nonrotatable horizontal hitch pin extending through said horizontal portion, a first tapered journal slidably mounted on said hitch pin, a second tapered journal rigidly mounted on said hitch pin, a pair of longitudinally spaced bearings presented by said horizontal portion and having internal surfaces tapered complementary to the external surface of said first and second journal, a first support means on said one of said units restraining said horizontal hitch pin from axial and radial movement, and a support and adjusting means restraining the radial movement of said hitch pin and for axially adjusting said slidable journal.

4. A hitch mounting for an articulated vehicle having front and rear units interconnected by a kingpin member comprising an upstanding portion adopted for horizontal pivoting of said units about a vertical axis and a horizontal portion rotatably engaging a horizontal hitch pin rigidly connected at one end to said front unit, said hitch mounting comprising: a sleeve having an axially split wall and an internal surface engaging said horizontal hitch pin, a cap having an axial split and a pair of wedging surfaces disposed on opposite sides of said axial split, said cap circumscribing said hitch pin and said sleeve, a support block on said front unit presenting wedging surfaces complementary to said wedging surfaces on said cap, a first tapered journal rotatably engaging one end of said horizontal portion and slidable axially of said hitch pin, a second tapered journal integrally mounted on said hitch pin and rotatably engaging the other end of said horizontal portion, said first and second journals having their enlarged external diameters at the outer ends of said horizontal portion, a plurality of cap screws fastened to said support block and extending through said cap so that tightening of said cap screws will radially contract said cap and sleeve into rigid relationshp with said hitch pin, and means operable to axially adjust said slidable journal including a lock nut screwed on the end of said hitch pin in axial thrust transmitting relation to said sleeve.

5. A hitch mounting for an articulated vehicle having front and rear units, interconnected for relative lateral tilting and horizontal angling about a kingpin member having an upstanding portion and a horizontal portion secured to one of said units, said hitch mounting comprising: a pair of tapered bearings mounted in said horizontal portion and having their enlarged internal diameters at opposite ends of said horizontal portion, a horizontal hitch pin extending through said horizontal portion, a first tapered juornal disposed in fixed relation to said hitch pin and rotatably engaging one of said bearings, a second tapered journal slidable axially of said hitch pin and rotatably engaging the other of said bearings, a support means nonrotatably securing one end of said hitch pin to said front unit, a radially contractible sleeve disposed on said hitch pin in thrust transmitting relation to said second juornal, means releasably securing said sleeve and hitch pin against radial movement relative to said front unit and means operable to axially adjust said sleeve to move said second juornal relative to said pin.

6. A hitch mounting for an articulated vehicle having front and rear units, interconnected for relative lateral tilting and horizontal angling about a kingpin member having an upstanding portion and a horizontal portion secured to one of said units, said hitch mounting comprising: a pair of tapered bearings mounted at opposite ends of said horizontal portion and having their enlarged internal diameters at the opposite ends of said horizontal portion, a horizontal hitch pin rigidly associated with said front unit and extending through said horizontal portion, a first tapered journal disposed on said hitch pin and rotatably engaged with one of said bearings, a second journal axially slidable of said hitch pin and rotatably engaged with the other of said bearings, a radially contractible sleeve axially slidable of and circumscribing said hitch pin, said sleeve being disposed in axial thrust transmitting relation to said second journal, a supporting clamp at the other end of said hitch pin and rigidly associated with said front unit and adjusting means for urging said sleeve against said second journal when said supporting clamp is released whereby adjustments may be made for bearing wear.

7. A hitch mounting for an articulated vehicle having front and rear units, interconnected for relative lateral tilting and horizontal angling about a kingpin member having an upstanding portion and a horizontal portion secured to one of said units, said hitch mounting comprising: a pair of tapered bearings disposed in said horizontal portion and having their enlarged internal diameters at opposite ends of said horizontal portion, a nonrotatable horizontal hitch pin extending through said horizontal portion and having a front end rigidly associated with and supported on said front unit, a first journal integrally connected at an intermediate point on said hitch pin and rotatably engaging one of said bearings, a second tapered juornal slidable axially of said hitch pin and rotatably engaging the other of said bearings, a contractible sleeve having a longitudinally split wall and mounted about said hitch pin in contiguous relation to said second journal, a clamping member circumscribing said sleeve and having a pair of opposed wedging surfaces laterally spaced from a longitudinal split in the lower portion of said clamping member, a support block rigidly attached to said front unit and presenting a pair of wedging surfaces corresponding to the surfaces on said clamping member, a plurality of cap screws fastened to said support member and extending through said clamping member so that tightening of said cap screws will contract said clamp and sleeve about said pin thereby rigidly securing said pin to said support block and so that loosening of said cap screws will permit axial movement of said sleeve and means for axially urging said sleeve against said second journal whereby adjustments for bearing wear may be made when said clamping member is loosened.

8. A hitch mounting for an articulated vehicle having front and rear units, interconnected for relative lateral tilting and horizontal angling about a kingpin member having an upstanding portion and a horizontal portion secured to one of said units, said hitch mounting comprising: a pair of tapered bearings mounted in said horizontal portion and having their enlarged internal diameters at the opposite ends of said portion, a horizontal hitch pin extending through said horizontal portion and being rigidly connected at one end to said front unit, a first journal integrally connected with said hitch pin and rotatably engaging one of said bushings, a second tapered journal slidable axially of said hitch pin and rotatably engaging the other of said bearings, a radially contractible sleeve encompassing said hitch pin and disposed in contiguous relation to said second journal, a clamping member rigidly associated with said front unit and engagaing said sleeve, and means for axially adjusting said slidable journal when said clamping member is loosened, said means comprising a lock nut screwed on the end of said hitch pin and cooperating with said sleeve.

9. A hitch mounting for an articulated vehicle having front and rear units, interconnected for relative lateral tilting and horizontal angling about a kingpin member having an upstanding portion and a horizontal portion secured to one of said units, said hitch mounting comprising: a pair of tapered bearings disposed in said horizontal portion and having their enlarged internal diameters at opposite ends of said horizontal portion, a horizontal hitch pin extending through said horizontal portion and rigidly associated at one end with said front unit, a first tapered journal rigidly connected to said hitch pin and rotatably engaging one of said bearings, a second journal slidable axially of said hitch pin and rotatably engaging the other of said bearings, a clamping member comprising an inner element in axial thrust transmitting relationship to said second journal and an outer element for selectively constraining said inner element, means drawing said inner element and outer element simultaneously into clamping relation about said hitch pin, and means transmitting thrust to said sleeve to axially move said second journal when said outer element is unclamped.

10. A hitch mounting for an articulated vehicle having front and rear units, interconnected for relative lateral tilting and horizontal angling about a kingpin member having an upstanding portion and a horizontal portion secured to one of said units, said hitch mounting comprising: a pair of tapered bearings disposed in said horizontal portion and having their enlarged internal diameters at opposite ends thereof, a nonrotatable horizontal hitch pin rigidly associated at one end with said front unit and extending through said horizontal portion, a first journal integrally connected with said hitch pin and rotatably engaging one of said bearings, a second journal slidable axially of said hitch pin and rotatably engaging the other of said bearings, a clamping member supporting said hitch pin at its other end and being rigidly associated with said front unit, and adjustable means urging said second journal into bearing contact with said bearings.

11. In an articulated vehicle having a front and a rear unit, a hitch construction comprising: a kingpin member having an upstanding portion and a horizontal portion secured to said front unit, a pedestal housing rotatably mounted on said upstanding portion and secured to said rear unit, an upper tapered bushing disposed within and having its maximum internal diameter at the upper end of said pedestal housing, a lower tapered bushing disposed within and having its maximum internal diameter at the lower end of said pedestal housing, a first journal integrally formed on said upstanding portion and rotatably engaging said lower bushing, a second journal axially slidable of said upstanding portion and rotatably engaging said upper bushing, adjustable means for urging said second journal into bearing contact with said upper bushing, a horizontal hitch pin rigidly associated at one end with said front unit and extending through said horizontal portion, a pair of tapered bearings disposed in said horizontal portion and having their enlarged internal diameters at the opposite ends thereof, a third journal rigidly connected to said hitch pin and rotatably engaging one of the said bearings, a fourth journal slidable axially of said hitch pin and rotatably engaging the other of said bearings, a radially contractible sleeve in axial thrust transmitting relation to said fourth journal, a clamping member circumscribing said sleeve and rigidly associated with said front unit, and adjusting means shifting said sleeve against said fourth journal when said clamping member is released to urge said third and fourth journals in bearing contact with said bearings.

12. In an articulated vehicle having a front and rear unit, a hitch construction comprising: a kingpin member having an upstanding and horizontal portion secured to said front unit, a pedestal housing rotatably engaging said upstanding portion and secured to said rear unit, an upper tapered bushing disposed within and having its maximum internal diameter at the upper end of said pedestal housing, a lower tapered bushing disposed within and having its maximum internal diameter at the lower end of said pedestal housing, a first journal integrally formed on said upstanding portion and rotatably engaging said lower bushing, a second journal slidable axially of said upstanding portion and rotatably engaging said upper bushings, a skirt covering the upper end of said pedestal and being axially slidable of said upstanding portion, an adjustable means to urge said skirt against said second journal to bring said upper and lower bushings in bearing contact with said first and second journals, a horizontal hitch pin extending through said horizontal portion, a pair of tapered bearings disposed in said horizontal portion and having their enlarged internal diameters at the opposite ends thereof, support means at one end of said hitch pin to restrain it against axial and radial movement, a third journal rigidly mounted on said hitch pin and rotatably engaging one of said bushings, a fourth journal axially slidable of said hitch pin and rotatably engaging the other of said bearings, a radially contractible sleeve axially slidable of said hitch pin and in thrust transmitting relation to said fourth journal, a clamping member engaging said sleeve and rigidly associated with said front unit, and means axially adjusting said fourth journal comprising a lock nut screwed on the end of said hitch pin and cooperating with said sleeve.

<p align="center">No references cited.</p>